United States Patent Office 2,817,687
Patented Dec. 24, 1957

2,817,687
PREPARATION OF m- AND p-DIISOPROPYLBENZENE

Herman I. Enos, Jr., Wilmington, Del., assignor to Hercules Powder Company, Wilmington, Del., a corporation of Delaware No Drawing. Application June 29, 1953
Serial No. 364,964

7 Claims. (Cl. 260—668)

This invention relates to the production of diisopropylbenzene and more particularly to the preparation of m-diisopropylbenzene and p-diisopropylbenzene.

The production of diisopropylbenzene for use as an antiknock fuel by alkylation of benzene with refinery gas is well known. However, the processes of the prior art have always led to mixtures of isomers from which the individual isomers were not separable in a pure state by distillation processes. The m-isomer, for instance, which is particularly desired for use as an intermediate for chemical syntheses by oxidation reactions, is not separable from the o-isomer by distillation nor from trimethylindane which is formed as a by-product from the o-isomer in the prior art processes. The presence of the o-isomer and trimethylindane was not recognized heretofore. In copending application, Serial No. 364,941, filed July 7, 1953, now abandoned, is described and claimed a process for the propylation of benzene to a mixture of diisopropylbenzene isomers free of the o-isomer and free of trimethylindane and from which m-diisopropylbenzene is readily separated by distillation. This process uses aluminum chloride as a catalyst in an amount within a critical range and a temperature in the range of 65–115° C. Under these conditions refinery gas cannot be used as the source of propylene, however, because other unsaturates present in the refinery gas also combine with the benzene ring. Thus to attain the advantages of this process for producing a mixture containing no o-isomer or trimethylindane, this cheap source of propylene cannot be used directly.

Now in accordance with the present invention, it has been found that m-diisopropylbenzene can be produced by a process which makes use of refinery gas as an economical source of propylene and which involves propylation of benzene with refinery gas for the production of a mixture of o-, m-, and p-diisopropylbenzene followed by isomerization of the mixed diisopropylbenzenes to a mixture of m- and p-diisopropylbenzenes substantially free of o-diisopropylbenzene and trimethylindane from which the m-diisopropylbenzene is separable by distillation. The process is carried out by propylating benzene with refinery gas using any suitable catalyst for the production of diisopropylbenzene and subsequently contacting the diisopropylbenzene with 0.1 to 2 mole percent of aluminum chloride at a temperature in the range of 65–115° C. and distilling m-diisopropylbenzene from the reaction mixture.

The process essentially involves an alkylation step for the preparation of diisopropylbenzene and an isomerization step for transfer of isopropyl groups under conditions that produce a reaction mixture containing essentially m-diisopropylbenzene but no o-diisopropylbenzene or trimethylindane, from which mixture the m-diisopropylbenzene is separable by distillation. In the isomerization step, other products such as benzene and polyisopropylbenzenes are produced. These by-products are preferably recycled to the isomerization step so that there is a continuous constant amount of these by-products flowing back to this step in the process. Alternatively, the benzene may be separately recycled to the alkylation step.

The process of the present invention may thus be expressed in its more specific aspect by the following flow sheet:

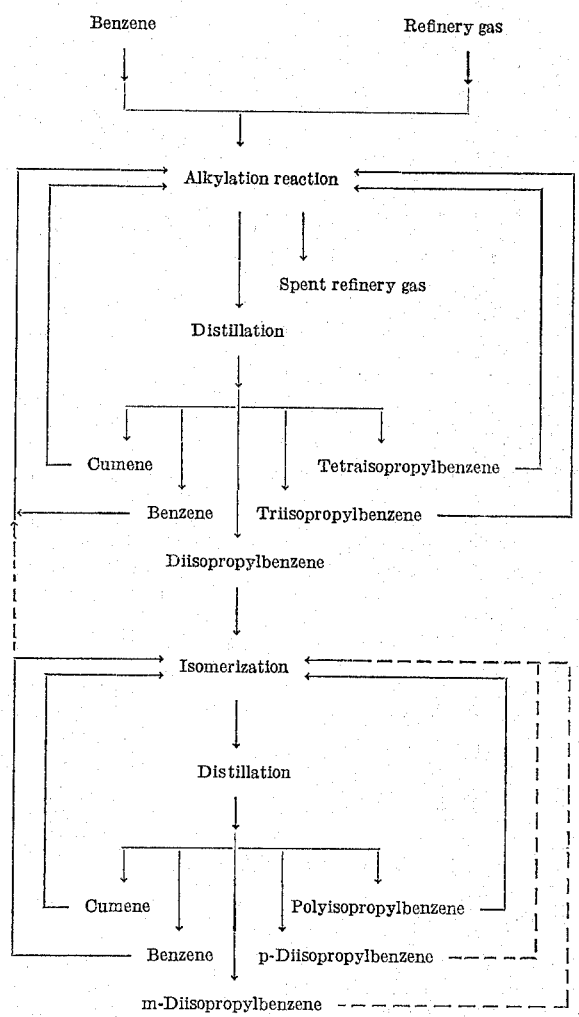

In the production of diisopropylbenzene free of trimethylindane in the first alkylation reaction, certain of the catalysts known in the art may be used provided the temperature is not allowed to rise so high as to cyclize the o-diisopropylbenzene initially present and provided the amount of catalyst is not so high as to catalyze this objectionable side reaction. Diisopropylbenzene, produced at as low a temperature and with as small an amount of catalyst as will bring about alkylation, will be free of trimethylindane, but higher temperatures are also satisfactory. For instance, with 80% sulfuric acid, temperatures of 50–80° C. may be used; with $AlCl_3$, temperatures up to about 115° C. may be used when the catalyst concentration is 0.1–2% $AlCl_3$ or temperatures below about 50° C. may be used with 5–10% $AlCl_3$. In order to avoid alkylation by the ethylene in the refinery gas, it is particularly important to use the milder of the effective alkylation conditions set forth or else to strip only part of the propylene out of the gas by maintaining an excess of propylene in the effluent gases by using very short contact time, low temperatures, or low catalyst content. Conditions for selective reaction with propylene are well known in the art. The most economical and satisfactory catalyst for the preparation of diisopropylbenzene mixed isomers, without contamination by ethylene condensation products, is sulfuric acid of about 80% strength. This catalyst does not cause contamination with trimethylindane.

The propylene used in the alkylation for preparation of the diisopropylbenzene may be pure propylene free of ethylene or it may be a mixture of propylene and ethylene. When the propylene-containing gas contains ethylene, the catalyst selected must be one which is selective. Sulfuric acid (80%), for example, is such a selective catalyst. As is well known, it can be used for preparing diisopropylbenzene from a mixture of propylene and ethylene without contamination with ethylated products. A product of the following composition is typical of one prepared using 126 parts by weight propylene in a refinery gas (containing propylene and ethylene in a 3:1 ratio) with 117 parts by weight benzene using 73.5 parts $H_2SO_4$ (80%):80.6 parts cumene, 95 parts diisopropylbenzene mixture, 27.9 parts tri- and tetra-isopropylbenzenes. The diisopropylbenzenes are in the relative ratio o-:m-:p-=2:4:6 and trimethylindane is absent.

The propylene-containing gas used in the alkylation step for the production of mixed diisopropylbenzenes for use in the isomerization step should be free of higher molecular weight unsaturates which might also react, but the gas may contain ethylene from which the propylene will be removed due to its greater reactivity. The process of this invention is particularly well adapted for use of refinery gases which are mixtures of ethylene, propylene, and saturated hydrocarbon gases. The term "refinery gas" is used herein to include only such gases as are free of higher unsaturates such as butene or butadiene. Such a refinery gas can be readily obtained from a gas containing these higher molecular weight unsaturated gases by well known selective adsorption methods whereby the higher molecular weight unsaturates are removed.

The isomerization step of the process of this invention involves a transfer of isopropyl radicals from one position in the benzenoid radical to the other, thus resulting in an equilibrium composition of m- and p-diisopropylbenzenes containing also benzene, cumene, and small amounts of triisopropylbenzene. This composition varies slightly with the temperature but for the range involved is approximately as follows: benzene 17%, cumene 51%, m-diisopropylbenzene 20%, p-diisopropylbenzene 10%, triisopropylbenzene 2%.

The isomerization step is carried out by mixing 0.1 to 2 mole percent (preferably 0.3 to 0.8 mole percent) anhydrous aluminum chloride powder with the diisopropylbenzene mixed isomers, preferably at a temperature below about 50° C. and then allowing the temperature to rise gradually to 65–115° C. (preferably 80–115° C.) at which temperature the reaction mixture is held until the resulting reaction mixture contains an equilibrium composition of approximately that set forth above. A particularly good method of operation for starting a batch is to add about 5 moles anhydrous aluminum chloride to 100 moles diisopropylbenzene cooled to about 10° C. and then to add the resulting mixture to 200–800 moles diisopropylbenzene mixture which may be at any temperature up to about 115° C. The catalyst is added at such a rate to the diisopropylbenzene mixture at this elevated temperature that the temperature is easily controlled. The diisopropylbenzene-aluminum chloride mixture should not be allowed to heat up above about 50° C. before being diluted with more diisopropylbenzene to the range of 0.1 to 2 mole percent based on the diisopropylbenzene with which it is mixed. The method of mixing the diisopropylbenzene and the aluminum chloride is not limited to any particular procedure, the only precaution to be observed is that the mole percent of aluminum chloride be kept in the range of 0.1 to 2 mole percent while the temperature is in the 65–115° C. range and preferably at any time the temperature is above about 50° C. for any appreciable period of time.

The reaction mixture after it has reached equilibrium is worked up by removing the catalyst by any of the well known methods such as dilution with water, preferably containing acid or caustic to dissolve the aluminum hydroxide produced. The catalyst-free product after separation from the aqueous layer is then freed of water, by drying agent or by distilling. The products are then fractionally distilled to separate the benzene, cumene, m-diisopropylbenzene, p-diisopropylbenzene, and triisopropylbenzene in the proportions indicated above. The m-diisopropylbenzene is recovered and may be refractionated if the first fractionation is inadequate. The p-diisopropylbenzene may also be recovered. In operating the process particularly for the production of m-diisopropylbenzene, the other alkylated products are recycled to the isomerization reaction along with fresh diisopropylbenzene.

In such a recycling procedure, the benzene to be recycled is advantageously used as the catalyst carrier. Thus the benzene is separately mixed with the aluminum chloride and the benzene-aluminum chloride complex is added to the mixture of fresh diisopropylbenzene mixture and other recycled by-products. In such a recycling process, the amount of fresh diisopropylbenzene mixture added is equal in molecular quantity to approximately the amount of m-diisopropylbenzene withdrawn. All of the benzene is not recycled, but an amount molecularly equal to about the amount of m-diisopropylbenzene which is withdrawn in the process is used for conversion into diisopropylbenzene mixed isomers. In this manner a process is built up which involves withdrawing equimolecular amounts of benzene and m-diisopropylbenzene from the cycle and adding an amount of diisopropylbenzene isomers equal to the sum of the molecular amounts of benzene and m-diisopropylbenzene withdrawn. The benzene withdrawn from the isomerization mixture is used for the preparation of fresh diisopropylbenzene in the first step of the process of this invention.

In a continuous recycled process starting from 100 lb. diisopropylbenzene in the isomerization step, about 37 lb. m-diisopropylbenzene is produced and withdrawn. About ½ lb. benzene is withdrawn and recycled to the alkylation step where it is converted into diisopropylbenzene. About 20 lb. p-diisopropylbenzene, about 27 lb. triisopropylbenzene, about 14 lb. cumene and about ½ lb. benzene are recycled to the isomerization reaction along with 37 lb. fresh diisopropylbenzene from the alkylation reaction. The cumene, which is recycled, is advantageously made into a catalyst complex with 0.1 to 2 lb. mol. anhydrous aluminum chloride per 14 lb. mol. cumene to aid in the introduction of the catalyst to the system. If desired or necessary to thin the catalyst, it may be diluted with part or all of the diisopropylbenzene and/or benzene to be used in the isomerization reaction, care being taken to keep the temperature from rising above about 50° C.

In the propylation reaction for the preparation of diisopropylbenzene, about 0.5 lb. benzene recycled from the isomerization step is recycled along with about 1.8 lb. benzene from a previous alkylation to a reactor along with 45.8 lb. fresh benzene. The mixture is cooled to about 30° C. and contacted with an equal volume of 88% sulfuric acid in a continuous process with temperature control. Then 24.5 lb. cumene, 47.4 lb. triisopropylbenzene, and 1.8 lb. tetraisopropylbenzene from a previous alkylation are added to the sulfuric acid catalyzed reaction mixture. While holding the temperature at 30° C. to 40° C. refinery gas containing about 15% by volume propylene is run in with rapid agitation. After the theoretical amount (2 moles) of propylene has combined, the organic portion is separated from the catalyst. The organic portion is washed with caustic, dried, and distilled. The distillate corresponds to approximately 100 lb. diisopropylbenzene isomers, which is separated and sent to the isomerization step, and 1.8 lb. benzene, 24.5 lb.

cumene, 47.4 lb. triisopropylbenzene, and about 1.8 lb. tetraisopropylbenzene, all of which are recycled to the alkylation step.

The composition of the isomerization mixture at temperatures of 80° and 100° C. in the isomerization reaction step described above is set forth in Table 1.

*Table 1*

| Components | Mole Percent at T° C. | |
|---|---|---|
| | 80° C. | 100° C. |
| Benzene | 2.0 | 2.0 |
| Cumene | 18.5 | 18.5 |
| m-Diisopropylbenzene | 37.2 | 37.2 |
| p-Diisopropylbenzene | 18.6 | 18.6 |
| Triisopropylbenzene | 21.0 | 21.0 |
| Tetraisopropylbenzene | 0.6 | 0.6 |

The isomerization reaction for isomerizing diisopropylbenzene to produce a mixture, from which m-diisopropylbenzene is readily separable by distillation, is carried out by contacting the diisopropylbenzene with 0.1 to 2 mole percent based on the moles benzenoid material in the reaction mixture of aluminum chloride at a temperature in the range of 65–115° C. for a time sufficient to produce a mixture containing substantial amounts of m-diisopropylbenzene and substantially no o-diisopropylbenzene and no trimethylindane.

The critical conditions of the isomerization process are the temperature range and the amount and type of catalyst used. Aluminum chloride is required for the production of a product substantially free of o-diisopropylbenzene, which boils so close to m-diisopropylbenzene as to make separation impossible when more than a trace of o-diisopropylbenzene is present. The temperature is critical in that it is only in the range of 65–115° C. that m-diisopropylbenzene is formed in substantial amounts and the o-isomer is substantially absent. At lower temperatures there is an increasingly larger proportion of the o-isomer produced, and this isomer prevents the separation of the m-isomer in pure form. At higher temperatures there is a greater tendency for by-product formation.

The amount of aluminum chloride is also critical in that more than 2 mole percent based on the benzenoid components of the reaction mixture causes by-product formation even in the 65–115° C. range which is necessary for the production of the favorable isomer ratio. The main by-product which is found to be formed due to an excess of aluminum chloride is trimethylindane which apparently is formed by the interaction of the isopropyl radicals in the o-isomer. This trimethylindane boils along with m-diisopropylbenzene in fractional distillation and is not separable by any known process of distillation. Its presence is readily detected by infrared absorption analysis.

In carrying out the process of this invention, the lower concentration of aluminum chloride catalyst in the range set forth is used with the higher temperatures in the range set forth, and the higher concentration of aluminum chloride catalyst in the range set forth is used with the lower temperatures in the range set forth. Thus 0.1 mole percent aluminum chloride used at a reaction temperature of 115° C. and 2 mole percent of aluminum chloride used at a reaction temperature of 65° C. will produce in either case a mixture of m- and p-diisopropylbenzene substantially free of o-diisopropylbenzene and trimethylindane from which m- and p-diisopropylbenzene are separable in substantially pure form.

While the process of this invention is equally satisfactory for the production of both m- and p-diisopropylbenzene, it is particularly valuable for the production of m-diisopropylbenzene which is the more difficult of the two isomers to produce in the pure state.

Unless stated otherwise all parts and percentages are by weight.

What I claim and desire to protect by Letters Patent is:

1. The method of preparing a diisopropylbenzene substantially free of o-diisopropylbenzene and trimethylindane which comprises propylating benzene in an alkylation reaction with a propylene-containing gas, containing no higher molecular weight unsaturates, in the presence of an acid-acting condensation catalyst to a reaction mixture rich in o-, m- and p-diisopropylbenzene isomers in nonequilibrium ratio and substantially free of higher alkylbenzenes and trimethylindane, and subsequently contacting the reaction mixture in an isomerization reaction with 0.1 to 2 mole percent of the reaction mixture of a catalyst consisting of aluminum chloride at a temperature in the range of 65–115° C. until an equilibrium reaction mixture enriched in m-diisopropylbenzene and substantially free of o-diisopropylbenzene and trimethylindane is obtained, and subsequently separating m-diisopropylbenzene from the isomerization reaction mixture by distillation.

2. The process of claim 1 in which the propylene-containing gas is a refinery gas.

3. The method of preparing a diisopropylbenzene substantially free of o-diisopropylbenzene and trimethylindane which comprises propylating benzene in an alkylation reaction with a propylene-containing gas, containing no higher molecular weight unsaturates, in the presence of an acid-acting condensation catalyst to a reaction mixture rich in o-, m- and p-diisopropylbenzene isomers in nonequilibrium ratio and substantially free of higher alkylbenzenes and trimethylindane, and subsequently contacting the reaction mixture in an isomerization reaction with 0.3 to 0.8 mole percent of the reaction mixture of a catalyst consisting of aluminum chloride at a temperature in the range of 80–115° C. until an equilibrium reaction mixture enriched in m-diisopropylbenzene and substantially free of o-diisopropylbenzene and trimethylindane is obtained, and subsequently separating m-diisopropylbenzene from the isomerization reaction mixture by distillation.

4. The method of preparing a diisopropylbenzene substantly free of o-diisopropylbenzene and trimethylindane which comprises propylating benzene in an alkylation reaction with a propylene-containing gas, containing no higher molecular weight unsaturates, in the presence of an acid-acting condensation catalyst to a reaction mixture rich in o-, m- and p-diisopropylbenzene isomers in nonequilibrium ratio and substantially free of higher alkylbenzenes and trimethylindane, and subsequently contacting the reaction mixture in an isomerization reaction with 0.1 to 2 mole percent of the reaction mixture of a catalyst consisting of aluminum chloride at a temperature in the range of 65–115° C. until an equilibrium reaction mixture enriched in m-diisopropylbenzene and substantially free of o-diisopropylbenzene and trimethylindane is obtained, separating the isomerization reaction mixture from the aluminum chloride, separating the m-diisopropylbenzene from the isomerization mixture by distillation and recycling the by-product benzene, cumene and polyisopropylbenzene to the isomerization reaction.

5. The method of preparing a diisopropylbenzene substantially free of o-diisopropylbenzene and trimethylindane which comprises propylating benzene in an alkylation reaction with a propylene-containing gas, containing no higher molecular weight unsaturates, in the presence of an acid-acting condensation catalyst to a reaction mixture rich in o-, m- and p-diisopropylbenzene isomers in nonequilibrium ratio and substantially free of higher alkylbenzenes and trimethylindane, and subsequently contacting the reaction mixture in an isomerization reaction with 0.1 to 2 mole percent of the reaction mixture of a catalyst consisting of aluminum chloride at a temperature in the range of 65–115° C. until an equilibrium reaction mixture enriched in m-diisopropylbenzene and substantially free of o-diisopropylbenzene and trimethylindane is obtained, and subsequently separating m-diisopropylbenzene and p-diisopropylbenzene from the isomerization reaction mixture by distillation.

6. The method of preparing a diisopropylbenzene substantially free of o-diisopropylbenzene and trimethylindane which comprises propylating benzene in an alkylation reaction with a propylene-containing gas, containing no higher molecular weight unsaturates, in the presence of an acid-acting condensation catalyst to a reaction mixture rich in o-, m- and p-diisopropylbenzene isomers in nonequilibrium ratio and substantially free of higher alkylbenzenes and trimethylindane, separating the reaction mixture from said catalyst, and subsequently contacting the reaction mixture in an isomerization reaction with 0.1 to 2 mole percent of the reaction mixture of a catalyst consisting of aluminum chloride at a temperature in the range of 65–115° C. until an equilibrium reaction mixture enriched in m-diisopropylbenzene and substantially free of o-diisopropylbenzene and trimethylindane is obtained, and subsequently separating m-diisopropylbenzene and p-diisopropylbenzene from the isomerization reaction mixture by distillation.

7. The method of preparing a diisopropylbenzene substantially free of o-diisopropylbenzene and trimethylindane which comprises propylating benzene in an alkylation reaction with a propylene-containing gas, containing no higher molecular weight unsaturates, in the presence of an acid-acting condensation catalyst to a reaction mixture rich in o-, m- and p-diisopropylbenzene isomers in nonequilibrium ratio and substantially free of higher alkylbenzenes and trimethylindane, and subsequently contacting the reaction mixture in an isomerization reaction with 0.1 to 2 mole percent of the reaction mixture of a catalyst consisting of aluminum chloride at a temperature in the range of 65–115° C. until an equilibrium reaction mixture enriched in m-diisopropylbenzene and substantially free of o-diisopropylbenzene and trimethylindane is obtained, separating the isomerization reaction mixture from the aluminum chloride, separating the m-diisopropylbenzene and p-diisopropylbenzene from the isomerization mixture by distillation and recycling the by-product benzene, cumene and polyisopropylbenzene to the isomerization reaction.

References Cited in the file of this patent

UNITED STATES PATENTS

| | | |
|---|---|---|
| 2,010,949 | Egloff | Aug. 13, 1935 |
| 2,385,524 | Mattox | Sept. 25, 1945 |
| 2,397,542 | Francis et al. | Apr. 2, 1946 |
| 2,403,785 | Britton et al. | July 9, 1946 |
| 2,421,331 | Johnson | May 27, 1947 |
| 2,429,691 | Johnson et al. | Oct. 28, 1947 |
| 2,527,824 | Kemp | Oct. 31, 1950 |
| 2,568,209 | Wackher et al. | Sept. 18, 1951 |
| 2,744,149 | Enos | May 1, 1956 |
| 2,744,150 | Enos | May 1, 1956 |

OTHER REFERENCES

Braddeley et al.: "Jour. Chem. Soc." (London) (1935), pp. 303–309.

Nightingale: Chemical Reviews, vol. 25 (1939), pp. 329–338.

Thomas: "Anhydrous Aluminum Chloride in Org. Chem." (1941), page 91, Reinhold, New York.

Newton: "Jour. Am. Chem. Soc.," vol. 65 (1943), pp. 320–323.

Melpolder et al.: "Jour. Am. Chem. Soc.," vol. 70 (1948), pp. 935–9.